US010195592B2

(12) United States Patent
Hwang et al.

(10) Patent No.: US 10,195,592 B2
(45) Date of Patent: Feb. 5, 2019

(54) ZIRCONIUM-BASED METAL-ORGANIC FRAMEWORKS AS CATALYST FOR TRANSFER HYDROGENATION

(71) Applicant: KOREA RESEARCH INSTITUTE OF CHEMICAL TECHNOLOGY, Daejeon (KR)

(72) Inventors: Young Kyu Hwang, Daejeon (KR); Jong San Chang, Daejeon (KR); Do Young Hong, Yongin-si (KR); Dong Won Hwang, Daejeon (KR); U Hwang Lee, Daejeon (KR); Kyung Ho Cho, Anseong-si (KR); Anil Haribhau Valekar, Daejeon (KR); Su Kyung Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 15/584,933

(22) Filed: May 2, 2017

(65) Prior Publication Data
US 2017/0320790 A1    Nov. 9, 2017

(30) Foreign Application Priority Data
May 3, 2016 (KR) .......... 10-2016-0054831

(51) Int. Cl.
C07D 307/00 (2006.01)
B01J 27/20 (2006.01)
B01J 37/03 (2006.01)
B01J 37/06 (2006.01)
B01J 31/26 (2006.01)
B01J 35/00 (2006.01)
B01J 35/10 (2006.01)

(52) U.S. Cl.
CPC .............. B01J 27/20 (2013.01); B01J 31/26 (2013.01); B01J 35/002 (2013.01); B01J 35/1023 (2013.01); B01J 35/1028 (2013.01); B01J 35/1047 (2013.01); B01J 37/036 (2013.01); B01J 37/06 (2013.01)

(58) Field of Classification Search
CPC .. C07B 35/02; C07F 17/00; C08F 4/64; B01J 27/20; B01J 37/036; B01J 37/06; B01J 35/002; B01J 35/1023; B01J 35/1028; B01J 35/1047; B01J 31/26
USPC .......................................... 549/326
See application file for complete search history.

(56) References Cited

PUBLICATIONS

Xia et al, Prediction of Hydrogen Storage Properties of Zr-based MOFs, Inorganica Chimica Acta, 444, p. 186-192. (Year: 2016).*
Chia et al., "Liquid-phase catalytic transfer hydrogenation and cyclization of levulinic acid and its esters to γ-valerolactone over metal oxide catalysts," Chem. Commun. 47:12233-12235 (2011).
(Continued)

Primary Examiner — Taylor V Oh
(74) Attorney, Agent, or Firm — Seed IP Law Group LLP

(57) ABSTRACT

The present invention relates to a catalyst for transfer hydrogenation, which is formed of a metal-organic framework having an MOF-808 based X-ray diffraction pattern. A high crystalline porous MOF-808 based metal-organic framework exhibits excellent performance in the transfer hydrogenation of ethyl levulinate (EL) at high and low temperature.

20 Claims, 9 Drawing Sheets

(56) References Cited

PUBLICATIONS

Glaser, "Nerve gas destruction with metal organic frameworks," *Clean Techn. Environ. Policy 18*: 351-358, 2016.
Li et al., "Facile synthesis of metal-organic framework MOF-808 for arsenic removal," *Materials Letters 160*: 412-414, 2015.
Song et al., "Porous Zirconium-Phytic Acid Hybrid: a Highly Efficient Catalyst for Meerwein-Ponndorf-Verley Reductions," *Angew. Chem. Int. Ed. 54*: 9399-9403, 2015.
Yuan et al., "Selective liquid phase hydrogenation of furfural to furfuryl alcohol by Ru/Zr-MOFs," *Journal of Molecular Catalysis A: Chemical 406*: 58-64, 2015.

\* cited by examiner

ZIRCONIUM-BASED METAL-ORGANIC FRAMEWORKS AS CATALYST FOR TRANSFER HYDROGENATION

TECHNICAL FIELD

The present invention relates to a catalyst for transfer hydrogenation formed of metal-organic frameworks having an Zr-based MOF based X-ray diffraction pattern.

BACKGROUND ART

To solve the problems of gradual depletion of fossil fuels and worsening environmental conditions, and to meet the energy demand for improving the quality of life, studies on alternative renewable resources are under way. Among several renewable resources, only some biomass species which are inexpensive and abundant in nature are sustainable sources of supply; otherwise, most resources are conventionally derived from liquid fuels and fossil resources. The development of a catalytic process for producing various platforms and value-added chemical materials directly from carbohydrates or directly from lignocellulosic biomass requires enormous effort. Among these chemicals, γ-valerolactone (GVL) is recognized as a versatile building block that can be used as an additive in liquid fuels for transportation, as a precursor for the production of polymeric monomers, and a precursor for the synthesis of various value-added chemicals including organic solvents and bio-oxygenates. GVL has proved itself as an excellent green solvent for biomass processing due to its extraordinary physicochemical properties such as low melting and high boiling-point, a remarkably low vapor pressure even at an elevated temperature, a ready miscibility with water without forming an azeotropic mixture, etc.

Generally, three major strategies have been explored for GVL production from levulinic acid (LA) and an ester thereof, based on diversity of hydrogen sources. Molecular $H_2$ is the most common hydrogen source used for this reaction, which occurs in the presence of various metal catalysts (e.g., Ru, Pt, Pd, Ni, Co, and Cu). Formic acid (FA), which forms an equimolar amount with LA during acid hydrolysis of carbohydrates, is also utilized as a hydrogen source to produce GVL from LA to embody the principle of atom economy. Several catalytic systems including nickel promoted copper-silica and Ag—Ni—$ZrO_2$ nanocomposites have been successfully utilized for utilized for quantitative conversion of LA into GVL by consuming equimolar FA as a hydrogen donor. However, the two hydrogenation strategies described above have some limitations (e.g., harsh reaction conditions, use of corrosive acids, and use of precious metals and non-environmental-friendly solvents) thus hindering their application to a large-scale production to some extent.

Recently, Dumesic et al. reported for the first time a catalytic transfer hydrogenation (CTH) method based on the principle of Meerwein-Ponndorf-Verley (MPV) reduction for the hydrogenation of LA and alkyl levulinates to GVL in the presence of a heterogeneous catalyst using secondary alcohols as a hydrogen donor. They have demonstrated that $ZrO_2$ displayed better activity than other metal oxides due to its amphoteric nature. The chemical selectivity of MPV reduction to the carbonyl groups of aldehyde and ketones, replacement of molecular $H_2$ by alcohols, and effective performance of catalysts containing non-precious metals provide a cost-effective alternative for the production of GVL. Accordingly, various catalytic systems, mainly based on zirconium such as $ZrO_2$, $ZrO(OH)_2$, and amorphous Zr-complexes [zirconium 4-hydroxybenzoate (Zr-HBA), zirconium phosphonate], were reported for the above action within a short period of time. Until now, only one report which describes the conversion of LA into GVL by the CTH reaction using crystalline porous material with an appropriate surface area (Zr-beta zeolite, 474 $m^2/g$) is available. However, the complex and time-consuming method for preparing catalysts limits its practical applications.

Generally, an organic/inorganic hybrid nanoporous material is also called "porous coordination polymer" or "metal-organic framework (MOF)". Metal-organic frameworks consist of metal-nodes or clusters, bridged through organic ligands to form a well-ordered, highly-crystalline porous network having a pore structure of molecular size or nano size (FIGS. 8A-8B). The excellent properties of the metal-organic frameworks such as a large surface area, fine-tunable pore size, coordinatively-unsaturated metal sites (CUSs), functionality of metal ions and organic ligands provide additional advantages in catalysis over non-porous and zeolitic materials. In particular, according to the coordination number and/or kinds of the central metal and the length and/or kinds of ligands, not only particular catalytic reactions can be performed within the metal-organic frameworks of various crystalline structures but also pore size for various reaction environments enabling selection of reactants and/or products and functionality thereof can be provided, and also the conditions for catalytic reactions can be controlled.

As used herein, the term "coordinatively unsaturated metal site" refers to a position as a site for the coordination of metals where a ligand coordinated by the metal ions of a metal-organic framework, representatively water, an organic solvent, etc., are removed, in which another ligand can form a coordination again. The coordinatively unsaturated metal site may be one formed by partial or entire removal of water, solvent molecules other than water, or ligands, which were contained in the metal-organic framework. In order to secure the coordinatively unsaturated metal site of the metal-organic framework, a pretreatment to remove water or solvent components bound to the metal-organic framework may be performed. As a method for the pretreatment, any method that can remove water or solvent components may be used as long as it does not induce a modification of the metal-organic framework. For example, the pretreatment may be achieved by heating to a temperature of 100° C. or above under reduced pressure, or the solvent-removing methods known in the art such as vacuum treatment, solvent exchange, sonication, etc., may be used without limitation.

SUMMARY OF THE INVENTION

An object of the present invention provides a catalyst for transfer hydrogenation which can act at room temperature.

Another object of the present invention provides a catalyst system for preparing γ-valerolactone or furfural alcohol, which is environment-friendly and enables a large-scale production under moderate reaction conditions.

A first aspect of the present invention provides a catalyst for transfer hydrogenation formed of a metal-organic framework having an Zr-based MOF based X-ray diffraction pattern.

A second aspect of the present invention provides a method for preparing γ-valerolactone by transfer hydrogenation of ethyl levulinate (EL) using the catalyst of the first aspect.

A third aspect of the present invention provides a method for preparing furfural alcohol by transfer hydrogenation of furfural using the catalyst of the first aspect.

Hereinafter, the present invention will be described in detail.

The present invention is characterized in that a metal-organic framework having an MOF-808 and its analogues based X-ray diffraction pattern of MOF-808 of Formula 1 or 2 below is used as a catalyst for transfer hydrogenation.

$$M_6O_4(OH)_4(BTC)_2(HCOO)_6 \qquad [\text{Formula 1}]$$

wherein M is a group 4A or 4B element, or a lanthanide metal whose oxidation state is $4^+$)

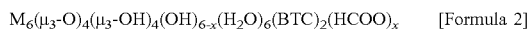

$$M_6(\mu_3\text{-}O)_4(\mu_3\text{-}OH)_4(OH)_{6-x}(H_2O)_6(BTC)_2(HCOO)_x \qquad [\text{Formula 2}]$$

wherein x is any number in the range of 0 to 6, and M is a group 4A or 4B element or a lanthanide metal whose oxidation state is $4^+$)

Non-limiting examples of the group 4A may include Ge, Sn, Pb, etc., and non-limiting examples of the group 4B may include Zr, Hf, Ti, etc., and non-limiting examples of the lanthanide metal whose oxidation state is $4^+$ may include Ce, Pr, Nd, Tb, Dy, etc.

Even if the central metal is the same, the environment within the pore of MOF and catalytic activity thereof can vary according to the crystalline structure of MOF, ligands, coordinatively unsaturated sites, etc., and it is thus difficult to predict which MOF may exhibit an excellent function of its own in a particular catalytic reaction condition.

The present inventors have studied the roles of central metal, ligand functional group and porosity characteristics of Zr-based metal-organic framework in the conversion of EL and selective preparation of GVL, through experimental designs in various aspects, examined the effects of different procedural parameters on the selectivity of products, and discovered active centers present in the MOFs, and as a result, they have discovered that MOF-808 is an excellent catalyst for transfer hydrogenation of ethyl levulinate (EL) into γ-valerolactone under moderate conditions. Accordingly, it was confirmed that MOF-808 is applicable to the transfer hydrogenation of furfural to furfuryl alcohol; levulinic acid (LA) to γ-valerolactone (GVL); furfural to 2-methylfuran (2-MF); 5-hydroxymethylfurfural (HMF) to 2,5-dimethylfuran (DMF); glycerol to 1,2-propanediol (1,2-PDO); fructose to 5-hydroxymethylfurfural (HMF); glucose to γ-valerolactone (GVL); fructose to γ-valerolactone (GVL); butyl levulinate (BL) to γ-valerolactone (GVL); glycerol to 1,2-PDO; (1-hydroxyethyl)benzene (1-HB) to ethylbenzene; 5-hydroxymethylfurfural (HMF) to 1,6-hexanediol (HDL); benzaldehyde to benzyl alcohol; hexahydrobenzaldehyde to hexahydrobenzyl alcohol; 4-methylbenzaldehyde to 4-methylbenzyl alcohol; methyl phenyl ketone to 1-phenylethanol; hexanal to 1-hexanol; 4-methyl-2-pentanone to 4-methyl-2-pentanol; cinnamaldehyde to cinnamyl alcohol; thiophene-2-aldehyde to 2-(hydroxymethyl) thiophene; 4-pyridinecarboxaldehyde to 4-pyridylcarbinol; or giranial to geraniol, and the present invention is based thereon.

The framework of MOF is formed by a covalent bond between secondary building units (SBUs) and organic ligands. MOFs are comprised of various coordination geometries, polytopic linkers, and ancillary ligands (F, OH, and $H_2O$ among others).

Conventionally, the zirconium in a Zr-MOF is generally present as a $Zr^{4+}$ cation, but the zirconium in the MOF-808 ($Zr_6O_4(OH)_4(BTC)_2(HCOO)_6$) is present as a $Zr_6O_4OH_4^{+10}$ cluster cation (FIGS. 8A-8B). UiO-66(Zr) and MOF-801 have almost similar porosity characteristics because they have the same coordination member (12) with regard to the linkers of central metal; however, MOF-808, which has the coordination member of 6 has a porosity characteristic significantly different from that of Zr-based metal-organic framework (UiO-66, UiO-66_$NH_2$, etc.) (Table 2 and FIGS. 9A-9B).

Micropores are defined as pores having a diameter of about 2 nm or less and mesopores are defined as those having a diameter in the range of about 2 nm to 50 nm. MOF-808 has a pore structure having two different (window) diameters, and in particular, has mesopores with a diameter of about 1.8 nm, unlike other Zr-MOFs (FIGS. 8A-8B).

MOF-801(Zr) is provided with a Zr central metal and a fumaric acid ligand and the Zr sites are not coordinatively saturated and thus the reactant of a catalytic reaction can be accessible to its inner pores.

In the case of UiO-66, reactants are not easily accessible because the Zr sites are coordinatively saturated, and most of the catalytic reactions occur on the surface of particles. In contrast, in the case of MOF-808(Zr), there are extra sites to which a reactant can access and additionally, due to the mesoporous characteristic (pore size: about 2 nm), reactions can occur not only on the external surface of a catalyst but also on the inner surface of the catalyst, and therefore, catalytic transfer hydrogenation (CTH) can also occur well at a temperature of 80° C.

From the viewpoint of catalysis, the MOF-808(Zr) based metal-organic framework according to the present invention can form continuous and permeable channels due to the high surface area and permanent porosity of the framework, and thus the reactant becomes accessible thereto and a larger number of active sites can be provided (Table 2). The presence of a larger channel or cage can better facilitate the diffusion thereby enhancing the interaction between the reactant and the active sites present in the porous network. Consequently, the reaction rate and the turnover frequency (TOF) to substrates increase, which is very desirable from the viewpoint of green chemistry.

Due to their relatively lower hydrolytic and thermal stability compared to that of zeolites, MOFs have limitations in their practical applications in various fields. However, due to the higher coordination number of zirconium, the MOF-808(Zr) based metal-organic framework exhibits unprecedented chemical, thermal, and mechanical stability.

Conventionally, catalysts of oxides and hydroxides of $ZrO_2$, $Zr(OH)_4$, etc. were used in Meerwein-Ponndorf-Verley (MPV) reaction or catalytic transfer hydrogenation (CTH). However, these catalysts had problems in that they have a low surface area and the active sites of Zr—O—Zr and Zr—OH—Zr are positioned continuously and thus the distance between the active sites is too close for a reactant to approach to react continuously thereby having a low turnover frequency (TOF) to substrates of the catalysts. Accordingly, a Zr-MOF was used to solve the above problems, and a series of various crystalline porous Zr-MOFs were prepared for the selection of a crystalline Zr-MOF, which has a large surface area and includes inorganic building blocks in a unit of cluster.

Among many Zr-MOFs, surprisingly, it was discovered that MOF-808 has a very large surface area and high reactivity per unit active site because inorganic building blocks (Zr clusters) are separated by organic ligands thus having high reduction reactivity even at a relatively low temperature, compared to $ZrO_2$.

Although CTH reactions at low temperature are reported in the Raney Ni catalyst, there is a problem in that the actual use thereof must be performed carefully considering that the catalyst has extremely high reactivity when exposed to air. However, if MOF-808 is used, the transfer hydrogenation of ethyl levulinate (EL) can be performed even in an open system.

The present inventors have synthesized a series of synthesis of crystalline porous Zr-MOFs, and tested a CTH reaction in which EL go through MIN reduction using isopropanol and bioalcohol as a hydrogen donor. For the understanding of the origin of active sites, the central metal of UiO-66(Zr) and the roles of ligand functional group were confirmed.

In the selective conversion of alkyl levulinate into GVL, ligand functional group (acid or base) was actually not effective but reduced the activity of the catalyst. Such a low conversion appears to be due to the low diffusion of EL through the narrow pores of UiO-66(Zr)—COOH, or limited occurrence of the reaction only on the external surface of UiO-66(Zr)—COOH.

Despite the structure rearrangement through experiments, the catalytic activity of UiO-66(Zr) is not affected. Furthermore, this supports that metal nodes rather than organic ligands are active sites in the selective conversion of EL into GVL. Additionally, from the results obtained from the characteristics of the unused catalysts and used catalysts, it was confirmed that the metal clusters/centers of the Zr-MOF framework are active sites that produce GVL from EL by CTH reaction.

The present inventors have discovered by experiments that the large surface area, large pore size, and balanced acid-base characteristics or electric charge of metal clusters are important factors in the selective conversion of EL into GVL. Specifically, the present inventors have discovered that ligand functional group changes the electronic characteristics and porous characteristics of the UiO-66(Zr) frame, which is the origin, thereby preventing the activity of the catalyst (Example 3). The presence of an electron-donating group or electron-withdrawing group on the ligands can change the electric charge of metal clusters, which significantly affects the activity of the catalyst.

Although both have the same window size (6 Å), UiO-66(Zr) has higher conversion (43.3%) compared to MOF-801 (28.1%). This may be due to the high external surface area (UiO-66(Zr): 390 $m^2/g$; and MOF-801: 168 $m^2/g$) and pore volume.

UiO-66(Zr) exhibited excellent chemical stability and catalytic activity at high temperature (200° C.). Therefore, UiO-66(Zr) appears to be an excellent potential catalyst in a high temperature reaction for biorefinery.

Meanwhile, MOF-808 has two different MOFs and different edges. MOF-808 can provide more active sites because it has a larger surface area, and more easily access to active sites because it has a larger pore size. MOF-808 and UiO-66(Zr) have acid and base sites within the structure. The amount of these sites is significantly larger in MOF-808 than in UiO-66(Zr). The origin of the acid-base sites was derived from Zr—O—Zr or Zr—OH—Zr bonding present in the metal clusters of Zr-MOFs. The acid-base ($Zr^{4+}$ and $O^{2-}$) sites of the metal clusters combine and interact with both EL and isopropanol to form a 6-membered ring transition state. The metal nodes which develop the acid-base characteristics in Zr-MOF are considered as active sites in the selective formation of GVL from EL.

Since MOF-808 has a large surface are and a wide pore structure, it was very effective in the formation of GVL from EL at high production rate (94.4 µmol/g/min) in an appropriate reaction temperature. Additionally, MOF-808 exhibited excellent performance in an open system using a solvent reflux method. MOF-808 catalysts can be recycled at least 5 times under a specified condition without loss of catalytic activity. Zr-MOFs have a unique property that can undergo a structural rearrangement to stabilize the framework as proven using several characterization techniques.

Accordingly, the catalytic activity in the transfer hydrogenation of MOF-808(Zr) can be equally applied to the metal-organic framework which has MOF-808 based X-ray diffraction pattern.

Furthermore, the metal-organic framework having an MOF-808 based X-ray diffraction pattern is not only an excellent catalyst in a moderate condition for transfer hydrogenation from ethyl levulinate (EL) to γ-valerolactone, but also furfural to furfuryl alcohol; levulinic acid (LA) to γ-valerolactone (GVL); furfural to 2-methylfuran (2-MF); 5-hydroxymethylfurfural (HMF) to 2,5-dimethylfuran (DMF); glycerol to 1,2-propanediol (1,2-PDO); fructose to 5-hydroxymethylfurfural (HMF); glucose to γ-valerolactone (GVL); fructose to γ-valerolactone (GVL); butyl levulinate (BL) to γ-valerolactone (GVL); glycerol to 1,2-PDO; (1-hydroxyethyl)benzene (1-HB) to ethylbenzene; 5-hydroxymethylfurfural (HMF) to 1,6-hexanediol (HDL); benzaldehyde to benzyl alcohol; hexahydrobenzaldehyde to hexahydrobenzyl alcohol; 4-methylbenzaldehyde to 4-methylbenzyl alcohol; methyl phenyl ketone to 1-phenylethanol; hexanal to 1-hexanol; 4-methyl-2-pentanone to 4-methyl-2-pentanol; cinnamaldehyde to cinnamyl alcohol; thiophene-2-aldehyde to 2-(hydroxymethyl) thiophene; 4-pyridinecarboxaldehyde to 4-pyridylcarbinol; or giranial to geraniol.

When the catalyst according to the present invention is used, various alcohols (isopropanol, methanol, ethanol, glycerol, and butanol), cyclic ethers, benzyl alcohol, cyclohexanone, 2-propanol, ethylene glycol, 2,3-dihydroindole, 1,2,3,4-tetrahydroquinoline, cylohexene, cyclohexadiene, limonene, hydrazine, ammonium formate, ammonium hypophosphite, a mixture thereof, etc., may be used as a hydrogen donor, and preferably, isopropanol may be used. Isopropanol is an excellent hydrogen-donating alcohol due to its low reduction potential.

When the catalyst according to the present invention is used for GVL production, it is more preferable to use EL rather than LA. First, EL gives a higher yield in ethanolysis of carbohydrates, and production separation from carbohydrates is easier due to its high volatility compared to LA. Second, there is no safety or economical concern over the corrosion of reactors because of its acid-free form.

When transfer hydrogenation is performed using the metal-organic framework having an MOF-808 based X-ray diffraction pattern as a catalyst at a temperature of room temperature to 250° C., preferably at 200° C. or below, more preferably at a low temperature of 80° C. to 130° C., the conversion of various substrates such as EL may be 90% or higher. Additionally, the selectivity of alcohol reactants may be increased by performing hydrogenation at a low temperature of 50° C.

Advantageous Effects of the Invention

The metal-organic framework having a highly crystalline, porous, MOF-808 based X-ray diffraction pattern, which exhibits excellent performance in transfer hydrogenation at low and high temperature, is useful for biorefinery and organic synthesis.

DETAILED DESCRIPTION OF THE INVENTION

Figure 1:
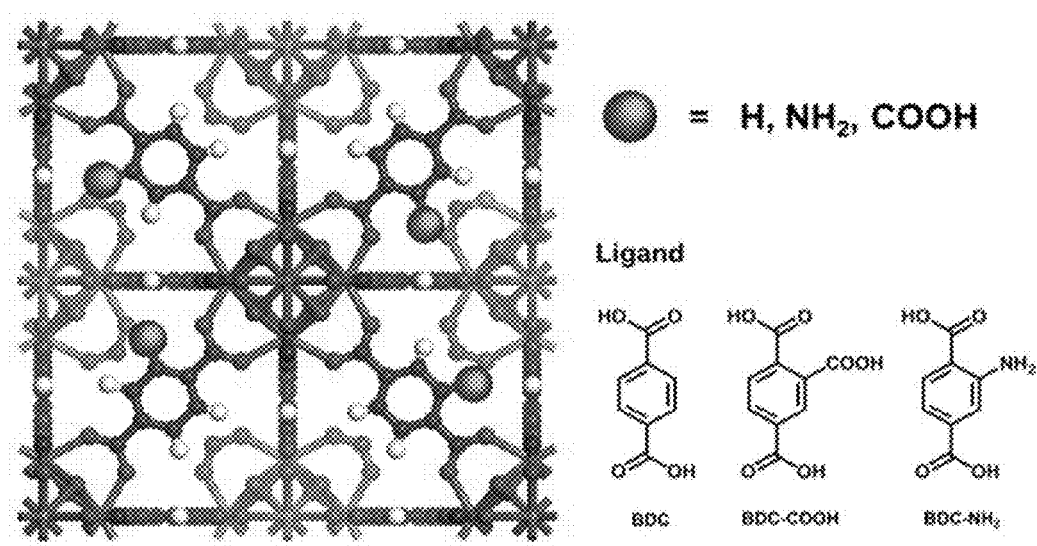
FIG. 1 shows a representative structural diagram illustrating UiO-66(Zr) and analogs thereof which are functionalized by other ligands.
Figure 2A:
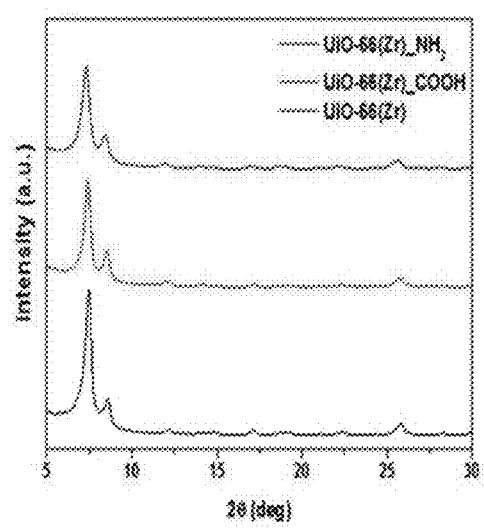
FIGS. 2A-2D show graphs illustrating a) XRD patterns, b) FTIR spectra, c) TGA profiles, and d) N2 adsorption at 77K, with regard to UiO-66(Zr) and functionalized analogs thereof.
Figure 2B:
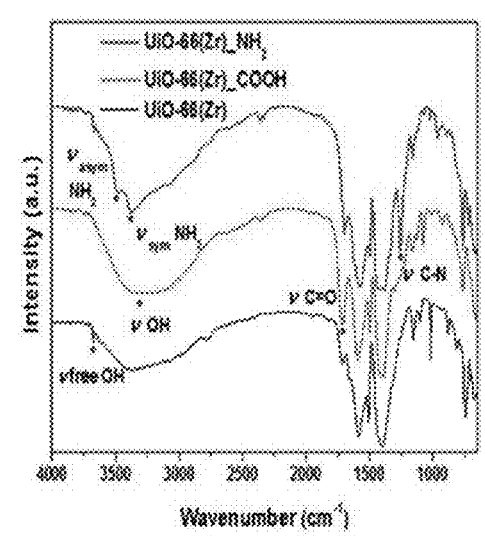
Figure 2C:
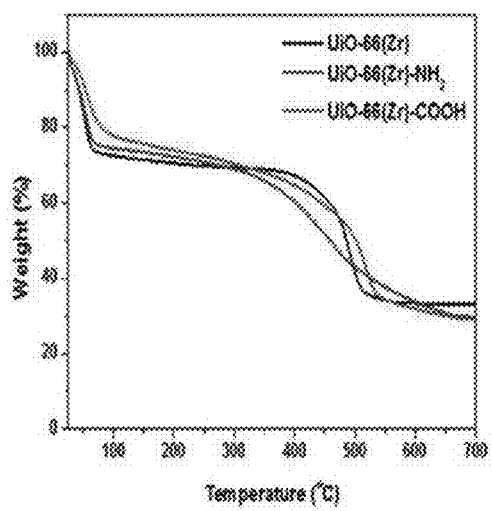
Figure 2D:
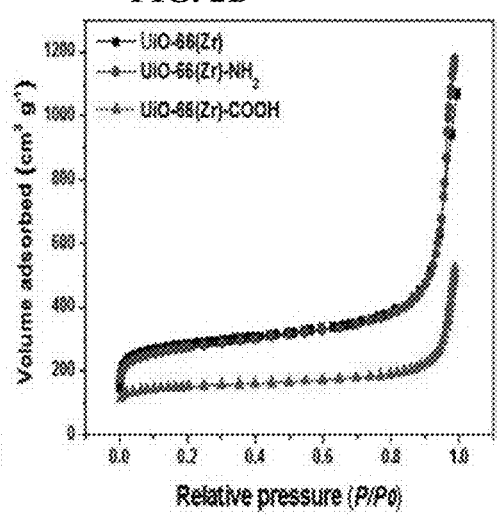

Hereinafter, the present invention will be described in more detail with reference to the following Examples. However, these Examples are for illustrative purposes only and the invention is not intended to be limited by these Examples.

Chemicals and Materials

Ethyl levulinate (99%), γ-valerolactone (99%), 2-propanol (99.5%), naphthalene (98%), $ZrOCl_2.8H_2O$ (98%), $ZrCl_4$ (99.5%), 1,4-benzenedicarboxylic acid ($H_2BDC$, 98%), 1,2,4-1,2,4-benzenetricarboxylic acid ($H_3BTC$, 99%), 2-aminoterphthalic acid (99%), 1,3,5-benzenetricarboxylic acid ($H_3BTC$, 95%), benzoic acid (99.5%), acetic acid (99.7%), HCl (37%), and N,N-dimethylformamide (99.8%) were purchased from Sigma-Aldrich.

Formic acid (99%) and fumaric acid (99%) were purchased from Samchun Pure Chemicals (South Korea) and isopropyl 4-oxovalerate (95%) was purchased from Beta Pharma Co., Ltd. (Shanghai, China). All chemicals were used without further purification.

PREPARATION EXAMPLE 1

Synthesis of UiO-66(Zr)

UiO-66(Zr) was synthesized by the reflux method. Specifically, $H_2BDC$ (4.62 g, 27.8 mmol) was dissolved in DMF (23.6 g, 322 mmol) in a 100 mL round flask at room temperature. Then, $ZrOCl_2.8H_2O$ (8.96 g, 27.8 mmol) and 37% HCl (4.63 mL, 5.47 g, 150 mmol) were added to the mixture. The molar ratio of the final $ZrOCl_2.8H_2O/H_2BDC/DMF/HCl$ mixture was 1:1:11.6:5.4. The reaction mixture was vigorously stirred to obtain a homogeneous gel. The mixture was heated to 150° C. and maintained thereat for 6 hours to obtain crystalline UiO-66(Zr) solid. The thus-obtained product was recovered from the slurry, re-dispersed in DMF at 60° C. for 6 hours while stirring, and recovered by filtration. The same procedure was repeated twice using methanol instead of DMF. Finally, the solid product was dried at 100° C. overnight.

PREPARATION EXAMPLE 2

Synthesis of UiO-66(Zr)—$NH_2$

UiO-66(Zr)—$NH_2$ was synthesized by the reflux method. First, 2-aminoterphthalic acid 1.94 g (10.7 mmol) was dissolved in water (38.4 mL) and acetic acid (9.2 mL, 160.1 mmol). Then, $ZrOCl_2.8H_2O$ (3.44 g, 10.7 mmol) was added to the solution with continuously stirring. The molar ratio of the final $ZrOCl_2.8H_2O/H_2BDC-NH_2/H_2O/CH_3COOH$ mixture was 1:1:200:15. The reaction solution was ramped to 100° C. and kept thereat for 24 hours. After cooling to room temperature, the precipitate in the reaction solution was filtered. To remove the residual precursor and ligands, the precipitate was sufficiently washed with water (80° C.) and ethanol (60° C.), respectively. Finally, the product was dried at 100° C. overnight.

PREPARATION EXAMPLE 3

Synthesis of UiO-66(Zr)—COOH

UiO-66(Zr)—COOH was also synthesized by the reflux method. Briefly, 1,2,4-benzenetricarboxylic acid (14 g, 66.7 mmol) and $ZrOCl_2.8H_2O$ (10.74 g, 33.3 mmol) were dissolved in water (30 mL) and benzoic acid (20.4 g, 166.6 mmol) in a 100 mL round flask. The molar ratio of the final $ZrOCl_2.8H_2O/H_3BTC/H_2O/C_6H_5COOH$ mixture was 1:2:50:5. Then, the reaction solution was ramped to 100° C. and kept thereat for 24 hours. Post-treatment was also performed in exactly the same manner as in the procedure mentioned for UiO-66(Zr)—$NH_2$.

PREPARATION EXAMPLE 4

Synthesis of MOF-808

$H_3BTC$ (4.8 g, 0.5 mmol) and $ZrOCl_2.8H_2O$ (3.3 g, 0.5 mmol) were added to a solvent mixture of DMF/formic acid (270 mL/360 mL). The reaction mixture was transferred to a 1 L Teflon-lined pressure autoclave and heated at 135° C. for 2 days. The white precipitate was collected by centrifugation, washed in DMF for 24 hours, and washed in ethanol for 24 hours. Each solvent was replaced twice during the above period, and finally, the product was dried at 100° C. for 12 hours.

PREPARATION EXAMPLE 5

Synthesis of MOF-801

MOF-801, commonly known as Zr-fumarate MOF, was synthesized according to the method disclosed in a previous journal publication. Briefly, $ZrCl_4$ (2.585 mmol, 1 eq.) was dissolved in 50 mL of water. Then, formic acid (258.5 mmol, 100 eq.) as a modulator and fumaric acid (7.75 mmol, 3 eq.) as a linker molecule were added to the metal precursor solution. The reaction mixture transferred into a Teflon-lined pressure vessel and heated at 120° C. for 24 hours. The resulting white precipitate was collected by centrifugation and washed with sufficient water and ethanol. Finally, the product was dried 100° C. at overnight.

EXAMPLE 1

Characterization of Catalysts

Powder diffraction patterns were obtained by the Rigaku diffractometer using Ni-filtered Cu Kα-radiation (40 kV, 30 mA, λ=1.5406 Å). The $N_2$ adsorption-desorption isotherms were measured at 77K using a Micromeritics Tristar 3000. The samples were dehydrated under vacuum at 423K for 12 hours before analysis. The specific surface areas were evaluated using the Brunauer-Emmett-Teller (BET) method and the pore volume was determined by the single point method at $p/p_0=0.99$. The micropore size distribution was determined from Ar sorption techniques using the Horvath-Kawazoe method. Thermal gravimetric analysis (TGA) of the catalysts was performed on a Sinco TGA-N 1000 thermal analyzer. The samples were run at a heating rate of 5° C./min in a range of 25° C. to 700° C. under constant flow of nitrogen at 20 mL/min. FTIR spectra were recorded on a Nicolet FTIR spectrometer (MAGNA-IR 560) using KBr pellets. Morphological properties of the catalysts were studied by scanning electron microscopy (SEM) (Tescan Mira 3 LMU FEG with an accelerating voltage of 10 kV). Acidic and basic properties of the catalysts were measured using $NH_3$-TPD and $CO_2$-TPD, respectively. TPD profiles of catalysts were measured on a Micromeritics AutoChem II 2920 V3.05 apparatus equipped with a thermal conductivity detector. Samples were activated at 150° C. for 12 hours in a helium flow, before the adsorption step. Subsequently, the activated samples were exposed to $NH_3$ or $CO_2$ gas at 50° C. for 30 minutes with a flow rate of 50 mL/min. First, the physically-adsorbed $NH_3$ and $CO_2$ gases were removed by purging with a helium gas for 1 hour at the same temperature and flow rate. TPD data were recorded from 50° C. to 300° C. with a heating rate of 5° C./min. Inductively-coupled plasma (ICP) analysis was used to determine the metal leaching from the Zr-MOFs.

EXAMPLE 2

Test of Catalyst and Product Analysis

In a typical run, EL (4 mmol), 2-propanol (400 mmol), and naphthalene (0.24 g), as internal standard materials, were filled into a 100 mL stainless steel reactor containing an inner lining of Pyrex glass and equipped with a magnetic stirrer. The reaction was performed at a certain known temperature for a desired period of time. The catalyst was separated by filtration and washed thoroughly with an ethanol-water system (95:5). The filtrate was subjected to quantitative analysis using gas chromatography (GC, FID detector and HP-5 column) and identification of the products was done by GC-MS (Agilent 6890N GC and 5973 N MSD). For the open-system solvent-reflux method, reactions were performed in 50 mL round-bottom flasks equipped with two-neck, septum ports and reflux condensers.

EXAMPLE 3

UiO-66(Zr) and Functionalized Derivatives Thereof

The MIN reduction reaction for different substrates can be effectively promoted by several Zr-containing catalysts, including porous and non-porous materials such as metal oxides, metal hydroxides, amorphous metal complexes, and zeolites. Due to the potential of porous materials for MIN reduction reaction, various zirconium-based metal-organic frameworks (Zr-MOFs) were tested for the CTH reaction of EL to GVL as shown in Reaction Scheme 1.

[Reaction Scheme 1]

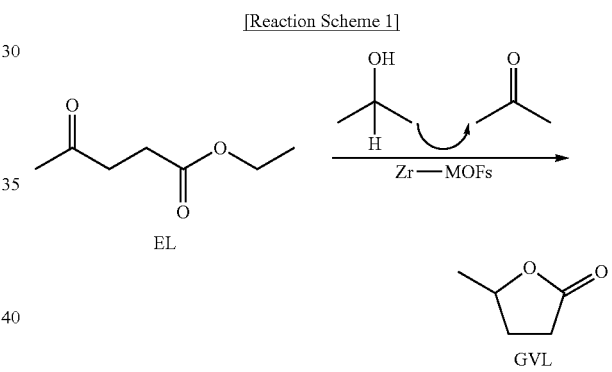

Reaction Scheme 1 represents the catalytic transfer hydrogenation (CTH) of EL to GVL using Zr-MOFs.

3.1 Role of Central Metal/Cluster and Ligand Functional Group of Zr-MOFs in CTH of EL MOFs possess multifunctional properties derived both from a metal cluster and ligand functional group. Therefore, it is highly desirable to understand the origin of active centers (either of metal cluster or ligand) to design a material superior for the respective application. Considering this point, the present inventors have synthesized UiO-66(Zr) and its functionalized analogs distinguished on the basis of ligand functional group, as shown in FIG. 1. Their structures were confirmed using XRD, FTIR, $N_2$ adsorption, and TG analysis, and are shown in FIGS. 2A-2D. Table 1 shows the physicochemical properties and catalytic activity of UiO-66 (Zr) and its functionalized analogs in CTH of EL to GVL.

TABLE 1

| Entry | Catalysts | $S_{BET}^b$ (m²/g) | $PV^c$ (cm³/g) | Conv.$^d$ (%) | $Y_{GVL}^e$ (%) | $Y_{IPL}^f$ (%) |
|---|---|---|---|---|---|---|
| 1 | None | — | — | 8.9 | 2.7 | 1.0 |
| 2 | UiO-66(Zr) | 1046 | 1.65 | 100 | 53.5 | 44.2 |

TABLE 1-continued

| Entry | Catalysts | $S_{BET}^{b}$ (m²/g) | $PV^c$ (cm³/g) | Conv.$^d$ (%) | $Y_{GVL}^{e}$ (%) | $Y_{IPL}^{f}$ (%) |
|---|---|---|---|---|---|---|
| 3 | UiO-6(Zr)—COOH | 575 | 0.80 | 28.5 | 13.9 | 13.5 |
| 4 | UiO-6(Zr)—NH₂ | 1006 | 1.8 | 97.6 | 27.3 | 64.6 |

Reaction conditions: EL (4 mmol), isopropanol (400 mmol); catalyst (0.8 g); naphthalene (0.24 g); temperature (50° C.); time (4 h).
$^b S_{BET}$ = BET surface area,
$^c$PV = pore volume,
$^d$Conv. = conversion,
$^e Y_{GVL}$ = GVL yield,
$^f Y_{IPL}$ = yield of isopropyl levulinate (IPL).

In the UiO-66(Zr) catalyst, the replacement of the BDC ligand with a functionalized BDC by electron donating and withdrawing groups significantly altered its chemical and physical properties. The presence of carboxylic acid functional group in the ligand delivers extra acidity to the UiO-66(Zr) framework. However, a considerable loss in surface area and pore volume of UiO-66(Zr)—COOH was observed. In contrast, the presence of amino groups in the ligand provides additional basicity to the UiO-66(Zr) structure with a minor loss in surface area, which was ascribed to the smaller size of NH₂ groups compared to that of COOH groups. The pore size distribution curves measured by the Ar-physisorption method (FIG. 3) shows that the pore size of UiO-66(Zr) and its functionalized analogs increased in the order of UiO-66(Zr)—COOH<UiO-66(Zr)_NH₂<UiO-66(Zr).

Isopropyl levulinate (IPL), the transesterified product of EL in the presence of 2-propanol, is the major side product observed in all cases. Among the tested catalysts, UiO-66(Zr), which has no ligand functionality, showed the maximum EL conversion and GVL yield. When the UiO-66(Zr)—COOH catalyst was used, 28.5% of EL conversion and 13.9% of GVL yield were achieved. It was assumed that the low conversion was possibly due to the slow diffusion of EL into the narrow pores of UiO-66(Zr)—COOH or the limited occurrence of the reaction to the external surface area of UiO-66(Zr)—COOH. On hand, nearly complete conversion of EL was observed when UiO-66(Zr)—NH₂ was used. However, with respect to product distribution, IPL was the major product with 64.6% yield. This clearly indicates that the transesterification reaction was predominant in the presence of amine functionalized UiO-66(Zr). Additionally, the presence of electron donating or withdrawing groups on ligands can change the charges on metal cluster which significantly affects the activity of a catalyst.

This result indicates that a large surface area, a big pore size, and a balanced acid-base property or charge on the metal cluster is a key factor in the selective conversion of EL into GVL. Ligand functional group prevents the activity of a catalyst by changing electronic and porous properties of the original UiO-66(Zr) framework.

3.2 Effect of Reaction Temperature

Figure 3:
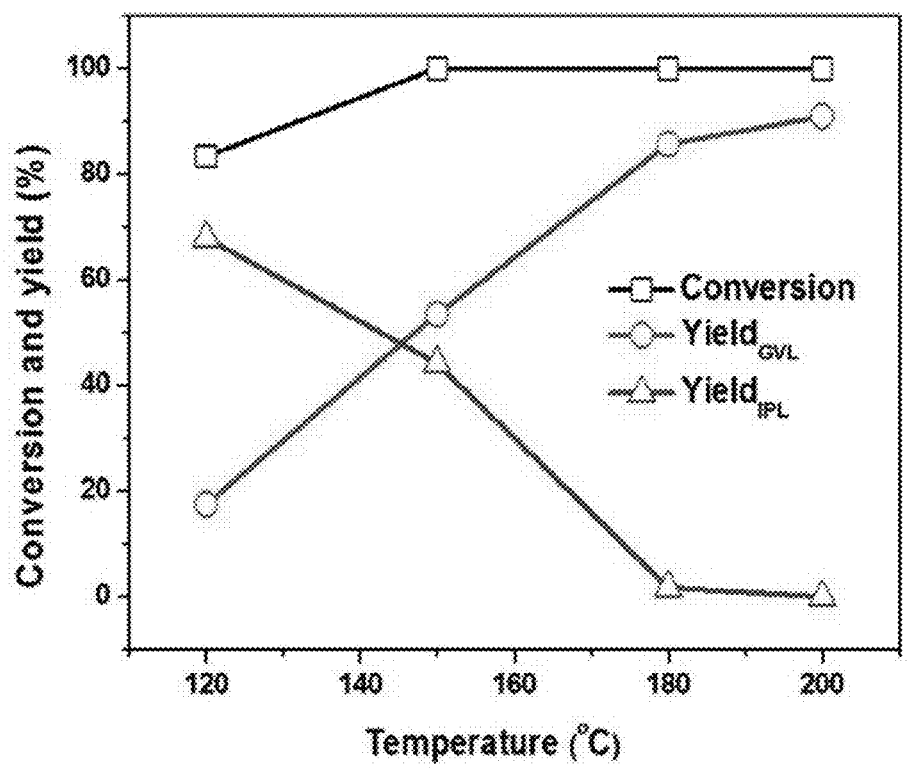
FIG. 3 shows graphs illustrating the effect of reaction temperature in the catalytic transfer hydrogenation of EL to GVL by UiO-66(Zr) (reaction conditions: EL (4 mmol), isopropanol (400 mmol), catalyst (0.8 g), naphthalene (0.24 g), and reaction time (4 h)).

The temperature dependence of the transfer hydrogenation reaction was exhibited in the range 120° C. to 200° C. for 4 hours of reaction time (FIG. 3). In most of the previous studies, transfer hydrogenation of LA or EL was carried out at moderate to high reaction temperature (120° C. to 250° C.). The reaction conversion was 83% at 120° C. and the temperature was increased by 30° C. each time. The yield of GVL increased with reaction temperature and reached the maximum of 92.7% at 200° C. At the same time, the IPL yield gradually decreased along with the rise in reaction temperature from 67.9% at 120° C. to 0% at 200° C. IPL is the major side-product at lower reaction temperatures, possibly because the replacement of a smaller ethyl group by bulkier isopropyl group may slow its diffusion through UiO-66(Zr) pore windows. The rise of the reaction temperature gradually increases the pressure inside the reactor, which facilitates the diffusion of EL into the pores of UiO-66(Zr) and then consequently undergoes the CTH reaction, as with EL, to produce GVL. From the above observation, it was confirmed that GVL can be formed at lower temperature and the rate of GVL formation increases with the increase of reaction temperature.

3.3 Effect of Reaction Time

Figure 4:
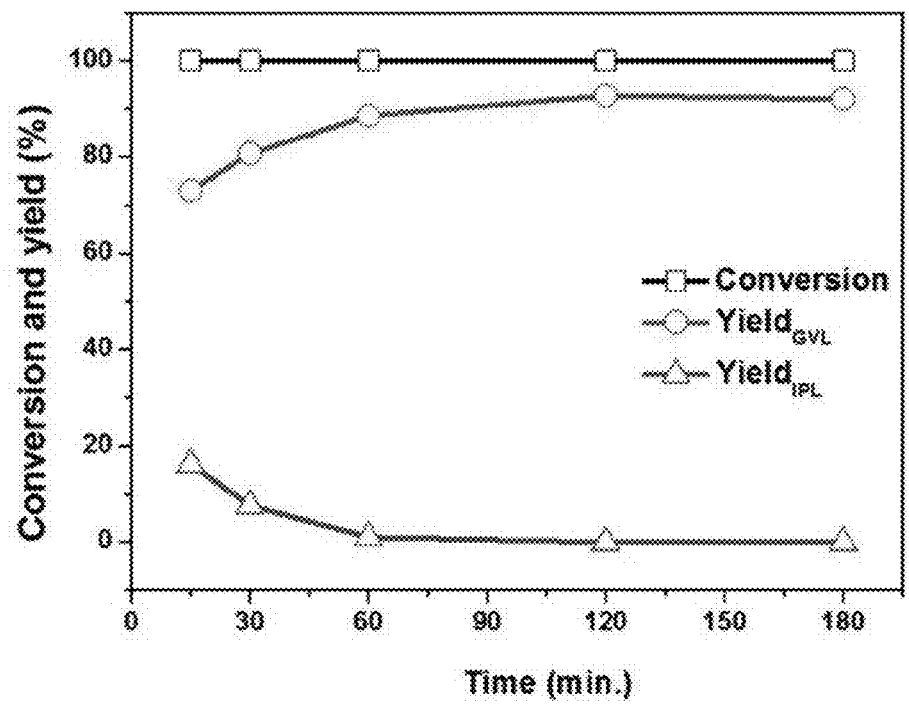
FIG. 4 shows a graph illustrating the effect of reaction time in the catalytic transfer hydrogenation of EL to GVL (EL (4 mmol), isopropanol (400 mmol), catalyst (0.8 g), naphthalene (0.24 g), and reaction temperature (200° C.)).

The present inventors have examined the influence of reaction time with regard to the conversion of EL to GVL on the CTH reaction at 200° C. The results showed that the conversion of EL was completed even at short duration (15 minutes) (FIG. 4). By increasing the reaction time from 15 minutes to 120 minutes, the GVL yield was increased from 70% to 92.7%. However, allowing the reaction to continue for 3 hours did not change the GVL yield. In contrast, the IPL yield gradually declined with the increase of the reaction time. This suggests that higher stability of the IPL is probably due to the limited diffusion through the porous window of UiO-66(Zr).

3.4 Catalyst Recyclability and Characterizations

Figure 5:
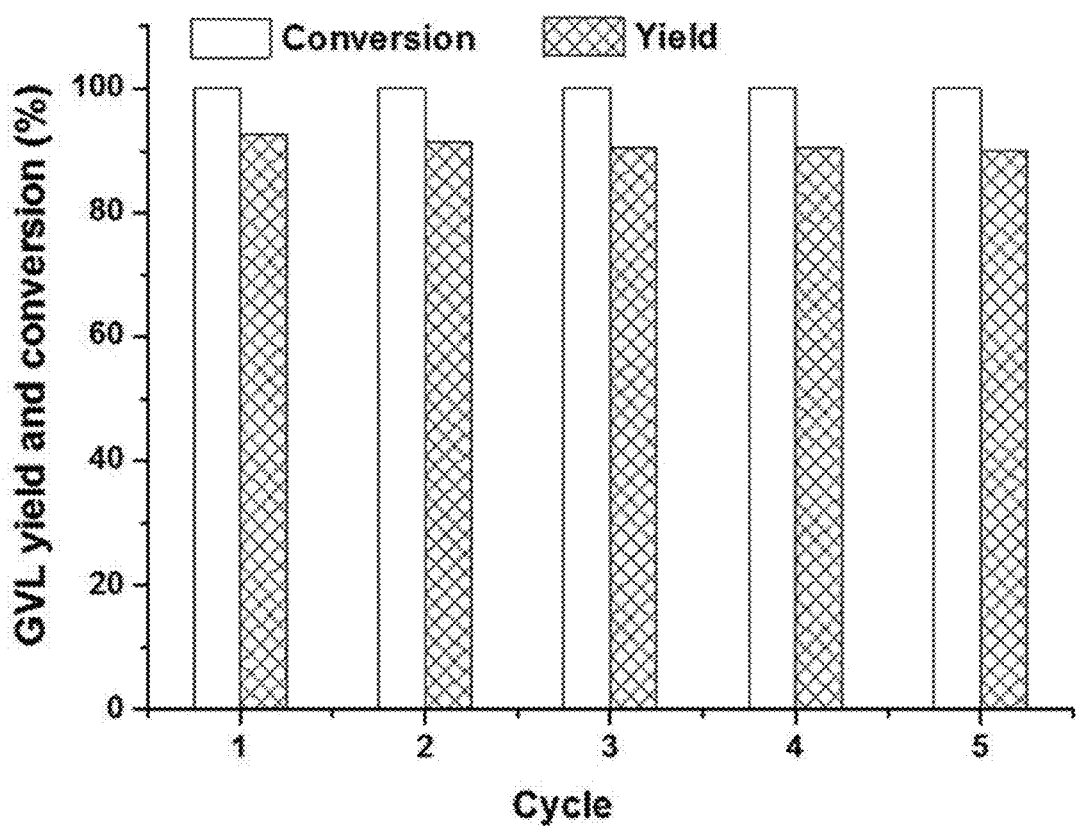
FIG. 5 shows a graph illustrating the experimental results of recycling of UiO-66(Zr) catalyst in the catalytic transfer hydrogenation of EL to GVL (EL (4 mmol), isopropanol (400 mmol), catalyst (0.8 g), naphthalene (0.24 g), reaction temperature (200° C.), and reaction time (2 h)).

A recycling test of UiO-66(Zr) for CTH of EL to GVL was performed under optimized reaction conditions and the results are shown in FIG. 5. After each cycle, the catalyst used was recovered by filtration, washed with an ethanol-water system (95:5), and dried prior to the next run. Even after the run for 5 cycles, only a negligible difference was observed in the EL conversion and GVL yield suggesting that there was almost no loss of active sites present in the catalyst.

Figure 6A:
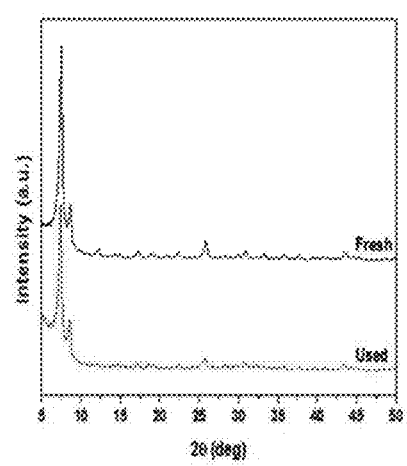
FIGS. 6A-6D show a graph illustrating the characteristics of unused UiO-66(Zr) and the used UiO-66(Zr) after 5 cycles ((a) XRD patterns, b) $N_2$ adsorption-desorption isotherm curves, c) TGA curves, and d) FTIR spectra.
Figure 6B:
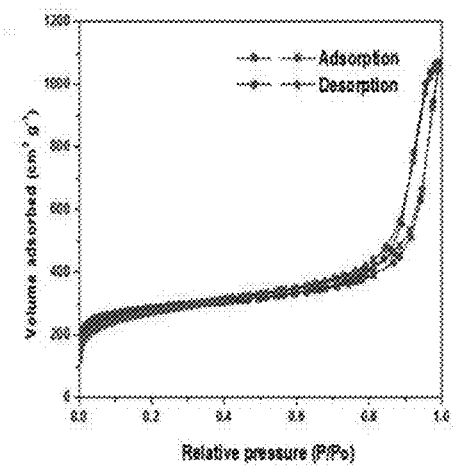

The recycled UiO-66(Zr) catalyst was analyzed, subjected to a test run for 5 cycles, and the changes in its structural and morphological properties were examined (FIGS. 6A-6D). With regard to the XRD patterns of the used UIO-66(Zr), all peaks were maintained with little decrease in peak intensity, compared to fresh catalysts (FIG. 6A). Similarly, a negligible difference was observed in BET surface area (1,046 m²/g and 1,000 m²/g) and pore volume (1.65 cm³/g and 1.63 cm³/g) of the catalyst as measured after 5 tests (FIG. 6B).

Figure 6C:
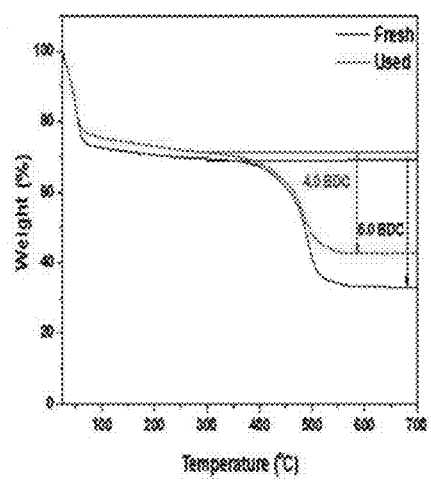
Figure 6D:
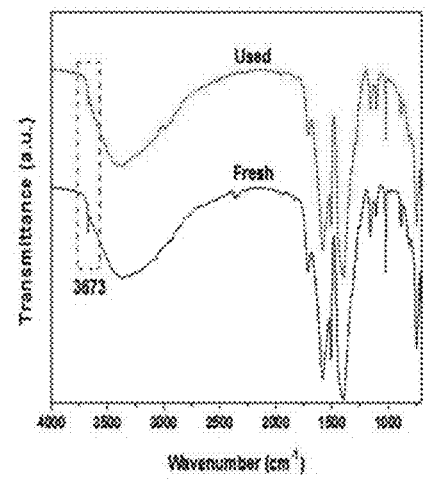
Figure 7A:
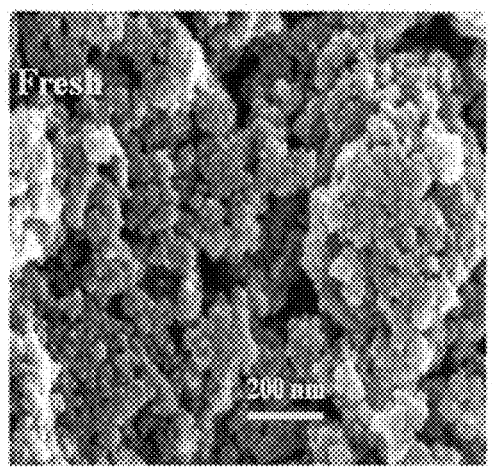
FIGS. 7A-7B show SEM images of a) an unused UiO-66(Zr) catalyst and b) a used UiO-66(Zr) catalyst.
Figure 7B:
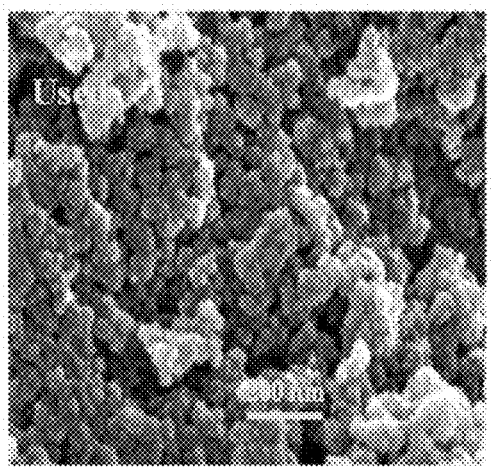

Nevertheless, differences were observed in the TG curve between the fresh and used catalysts (FIG. 6C). The fresh catalyst absorbed more water than did the used catalyst, which was determined by a slightly greater weight loss before 75° C. The number of BDC ligands present in the fresh and used UiO-66(Zr) was calculated from the weight loss that occurred at a temperature of 350° C. to 550° C. Despite the good crystalline structure, the fresh UiO-66(Zr) has one linker deficiency and the missing linker defect was assumed to be capped by the —OH groups. In this case, the proposed formula for the fresh UiO-66(Zr) was $Zr_6O_4(OH)_4(OH)_2(BDC)_5$. After 5 cycles, the catalyst lost one additional BDC linker from its framework (in which BDC anions combine with two protons from OH of a hexanuclear Zr cluster and neutral acid departs) leaving a material with the formula $Zr_6O_6(OH)_4(BDC)_4$. The charge imbalance generated due to the linker deficiency was compensated by a partial replacement of $\mu_3$-OH⁻ ions with $\mu_3$-OH²⁻ ions. That the morphology of the catalyst remains unchanged was confirmed by SEM analysis (FIGS. 7A-7B). ICP analysis failed to detect the presence of any zirconium in the reaction filtrate thus confirming that there was no leaching of zirconium from the MOF framework.

All of the above observations confirmed that UiO-66(Zr) has a unique property to undergo a structural rearrangement in ways that stabilize its structure. Despite the structural rearrangement, the catalytic activity of UiO-66(Zr) was not affected. Therefore, it is suggested that the metal nodes, rather than the organic ligands, are the active sites in the selective transformation of EL to GVL.

EXAMPLE 4

MOF-808

4-1. Evaluation of Zr-MOFs Possessing Different Physico-Chemical Properties for CTH Reaction of EL to GVL After confirming the active sites in UiO-66(Zr) for transfer hydrogenation of EL, the present inventors have checked the possibility whether other Zr-MOFs may be more suitable as candidates for the transfer hydrogenation reaction. To overcome the use of high reaction temperature was another object to solve in the present invention. To this end, two alternative Zr-MOFs (MOF-801 and MOF-808), which possess a metal center ($Zr_6O_4(OH)_4$) in their framework as in UiO-66(Zr) were selected for the reaction. The porous properties of the selected Zr-MOFs along with linkers and molecular formulas are shown in Table 2 below.

TABLE 2

| MOF | Linker | Molecular formula | $S_{BET}{}^a$ ($m^2/g$) | $PV^b$ ($cm^3/g$) | $PD^c$ (Å) |
|---|---|---|---|---|---|
| MOF-801 | 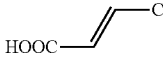 Fumaric acid | $Zr_6O_4(OH)_4(fumarate)_6$ | 990 | 0.44 | 6 |
| UiO-6(Zr) |  $H_2BDC$ | $Zr_6O_4(OH)_4(BDC)_6$ | 1046 | 1.65 | 6 |
| MOF-808 | 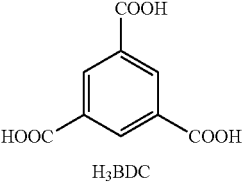 $H_3BDC$ | $Zr_6O_4(OH)_4(BTC)_2(HCOO)_6$ | 1450 | 0.8 | 7.4, 12.5 |

$^a S_{BET}$ = BET Surface Area,
$^b$PV = Pore Volume,
$^c$PD = Pore Diameter

Figure 8A:
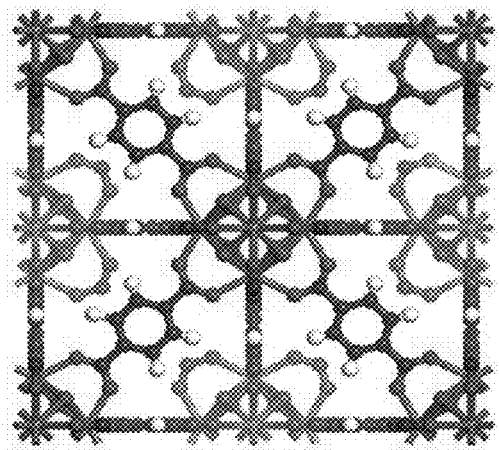
FIGS. 8A-8B show representative structural diagrams of Zr-MOFs ((a) UiO-66 and b) MOF-808)).
Figure 8B:
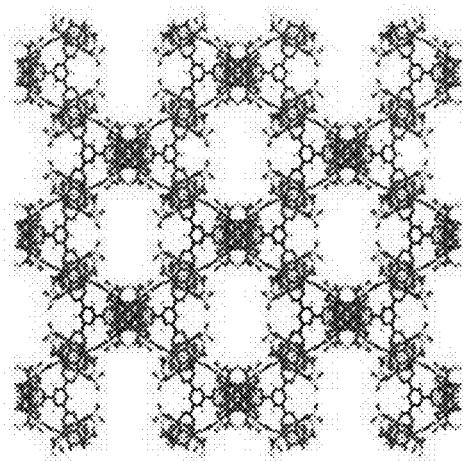
Figure 9A:
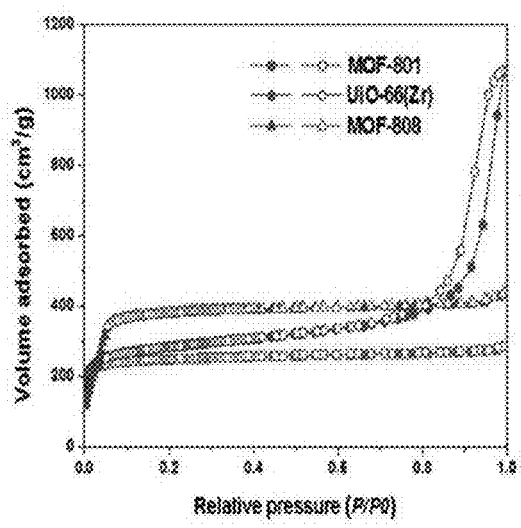
FIGS. 9A-9B show a graph illustrating a) $N_2$ adsorption isotherm (at 77 K) of Zr-MOFs and shows a graph illustrating b) micropore size distribution of Zr-MOFs calculated using the Horvath-Kawazoe method.
Figure 9B:
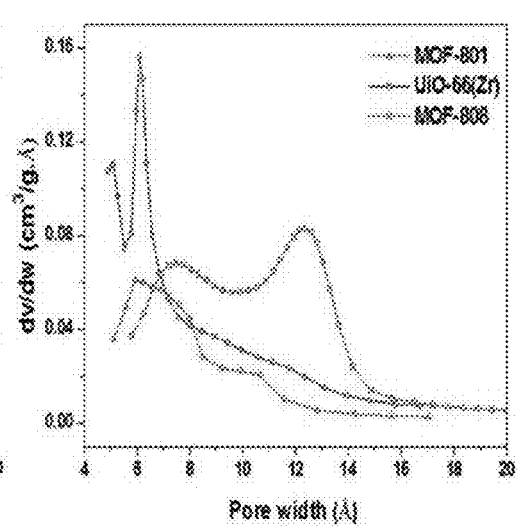

Representative structures of the two Zr-MOFs are shown in FIGS. 8A-8B. Since UiO-66(Zr) and MOF-801 have the coordination number (12) to the link in the metal center they have almost similar porous properties. However, MOF-808 with a central metal-to-linker coordination number of 6 possesses porous properties different from those of other two Zr-MOFs (Table 2 and FIGS. 9A-9B). Due to the large surface area and bigger pore size of MOF-808, the catalytic performance of the catalyst was examined at a moderate reaction temperature to represent the principle of green chemistry.

TABLE 3

| Entry | Temp.Catalyst | Temp. (° C.) | Time (h) | Conv. (%) | Yield (%) | Mass ratio catalyst:ester | GVL $FR^h$ (μmol/g/min) |
|---|---|---|---|---|---|---|---|
| 1 | MOF-808 | 130 | 3 | 100 | 85.0 | 1:2.9 | 94.4 |
| 2 | UiO-66(Zr) | 130 | 3 | 43.3 | 8.0 | 1:2.9 | 8.9 |
| 3 | MOF-801 | 130 | 3 | 28.1 | 12.2 | 1:2.9 | 13.6 |
| $4^b$ | $ZrO_2$ | 120 | 4 | 36.6 | 12.2 | 1:4.8 | 14.2 |
| $5^c$ | Zr-HBA | 120 | 4 | 82.1 | 50.1 | 1:0.7 | 10.4 |
| $6^d$ | Zr-PhyA | 130 | 8 | 98.9 | 95.4 | 1:0.7 | 9.9 |
| $7^e$ | Zr-Beta | 118 | 22 | 88 | 83 | 1:1.2 | 6.3 |
| $8^f$ | Zr-Beta | 82 | 18 | 5.6 | 4.0 | 1:0.6 | 0.2 |
| $9^g$ | MOF-808 | 82 | 18 | 100 | 75 | 1:0.7 | 3.5 |

Reaction conditions: EL 4 mmol; isopropanol

Table 3 demonstrates the catalytic activity of various Zr-based catalysts at moderate reaction temperature. In fact, MOF-808 has different edges from those of the other two MOFs. MOF-808 can provide more active sites due to a greater surface area and provide an easier access to active sites due to a bigger pore size. Despite the same window size (6 Å), UiO-66(Zr) shows higher conversion (43.3%) than MOF-801 (28.1%). This may probably be due to the higher external surface area (390 m²/g for UiO-66(Zr) and 168 m²/g for MOF-801) and pore volume of MOF-808. The present inventors have compared the results with those of other Zr-based catalysts reported in the literatures, studied under comparable reaction conditions (entries 4 to 8). MOF-808 was found to be superior in terms of GVL formation rate compared to all other catalysts mentioned in Table 3 under specific reaction conditions. Amorphous Zr-complexes also showed good performance at lower temperature (entries 5 and 6), but they lagged behind MOF-808 in terms of GVL formation rate. This is due to their low crystallinity or poorly-ordered structure, which resulted in a smaller surface area compared to highly-ordered, crystalline MOF-808.

With the exceptional catalytic activity of MOF-808, the present inventors have extended the approach and performed the reaction in an open system using the solvent reflux method (entry 9). In organic synthesis, several reduction reactions were performed using homogeneous catalytic systems. The moisture sensitivity, stoichiometric use, and difficulties in separation and reusability of the catalysts can lower the efficiency of the homogeneous systems. Accordingly, it is highly preferred that a heterogeneous catalyst be used to overcome the difficulties associated with homogeneous catalytic systems. MOF-808 showed good performance in an open system MIN reduction of EL at its boiling point, producing 75% GVL yield in 18 hours. In contrast, Zr-beta converted only 5.6% of LA with 4.0% yield of GVL in 18 hours (entry 8). These results show the high catalytic activity of MOF-808 and its potential as an efficient heterogeneous catalyst in CTH reactions even in organic synthesis where most reactions are performed in an open system.

Figure 10:
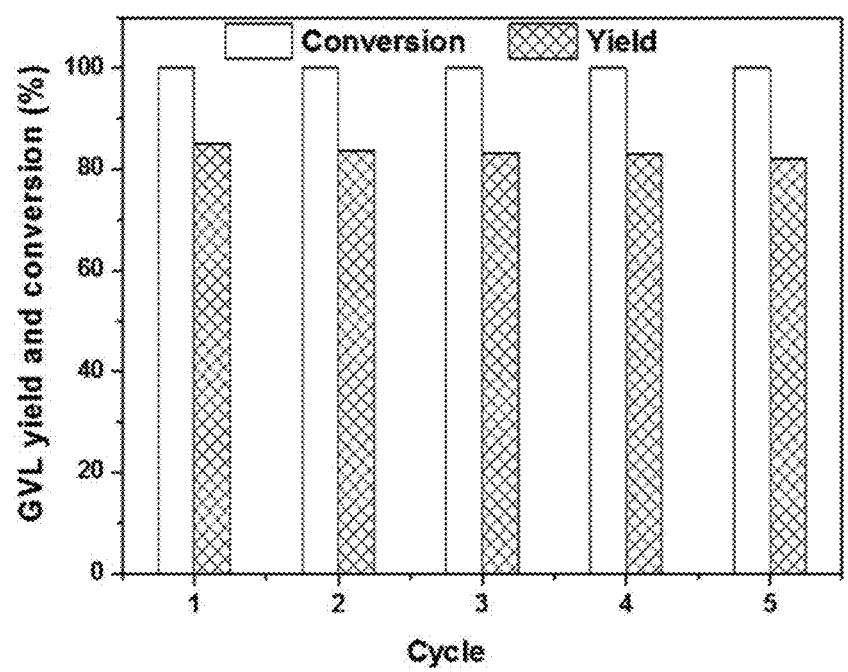
FIG. 10 shows the results of a recycling test of MOF-808 catalyst (reaction conditions: EL (4 mmol), isopropanol (400 mmol), catalyst (0.2 g), naphthalene (0.24 g), reaction temperature (130° C.), and reaction time (3 h)).
Figure 11A:
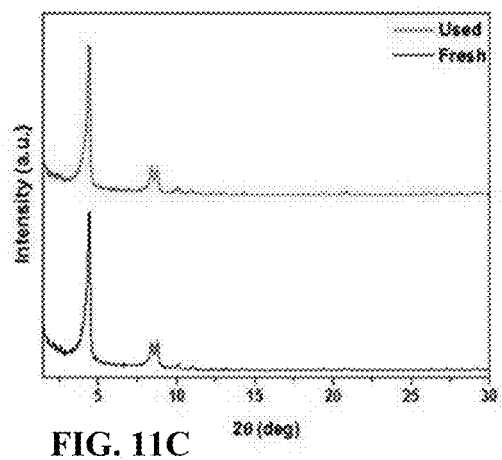
FIGS. 11A-11F show results illustrating the characteristics of unused MOF-808 and the used MOF-808 after 5 cycles ((a) XRD patterns, b) N2 adsorption-desorption isotherm at 77 K, c) TGA curves, and d) FTIR patterns, and SEM images e) Fresh and f) Used.
Figure 11B:
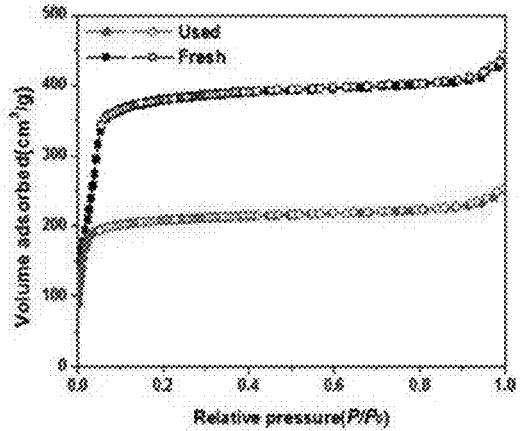
Figure 11C:
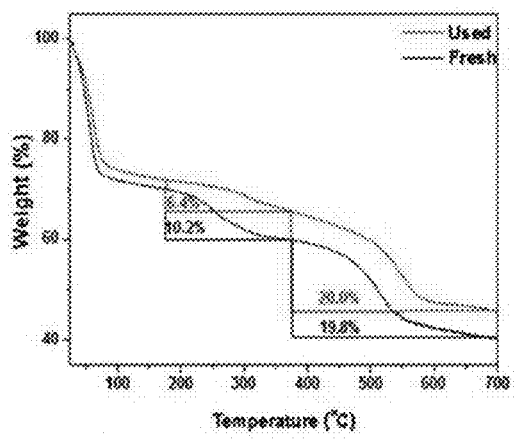
Figure 11D:
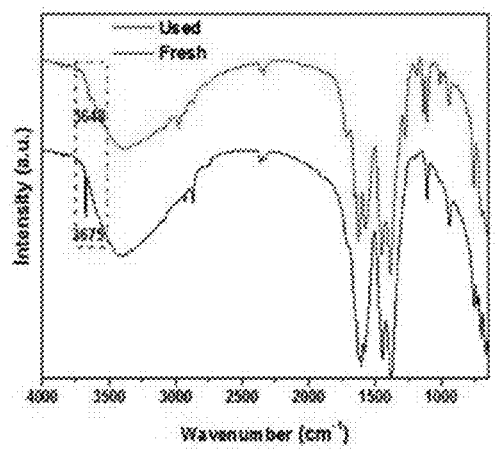
Figure 11E:
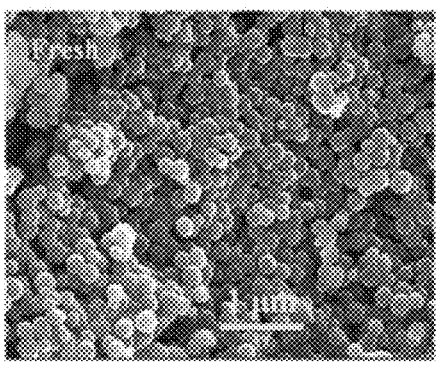
Figure 11F:
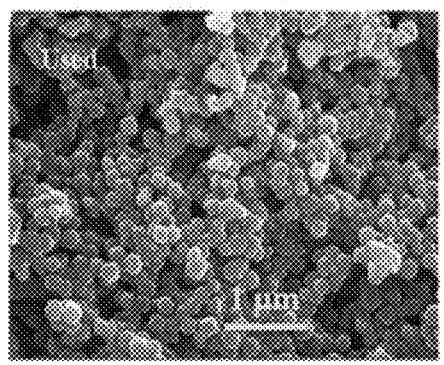
Figure 12A:
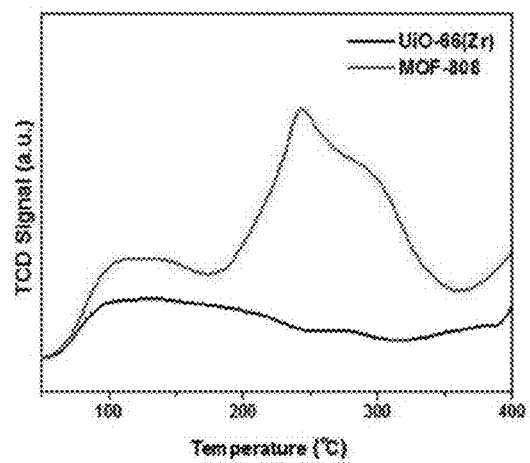
FIGS. 12A-12B show graphs illustrating the profiles of temperature programmed desorption (TPD) of Zr-MOFs, in which a) $NH_3$ and b) $CO_2$ were used as probe molecules.
Figure 12B:
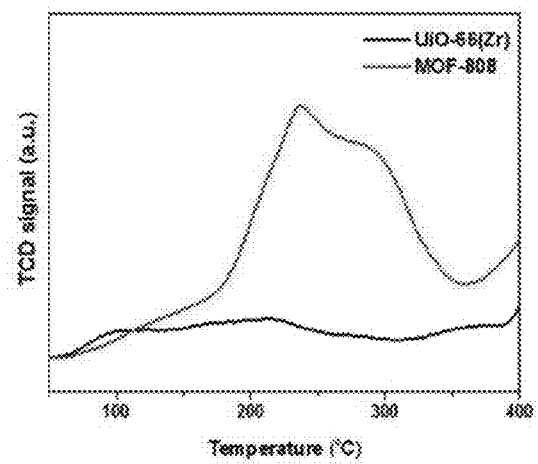

Additionally, MOF-808 was recycled 5 times in a batch-type pressurized reaction system without a notable change in its catalytic activity (FIG. 10). As shown in FIGS. 11A-11F, the recycled catalyst was characterized in detail, using X-ray diffraction, $N_2$ physisorption, TGA, FTIR, and SEM analysis. XRD patterns displayed no change in the crystal structure of the used catalyst; all the peaks retained the same intensity. TGA and FTIR patterns confirmed the structural changes that occurred in the catalyst after the fifth run. The weight loss at a temperature of 375° C. to 700° C. assigned to the BTC ligand was almost identical, thus confirming there was no leaching of the BTC ligand from the structure. The substantial decrease in OH stretching frequency in the FTIR pattern of the used catalyst indicates the deviations in the OH group present in MOF-808. Morphological and X-ray diffraction studies suggested that no phase transition or structural collapse occurred even after 5 recycle tests, and this observation is in line with the high chemical stability of MOF-808.

EXAMPLE 5

Transfer Hydrogenation of Furfural into Furfuryl Alcohol Using MOF-808

Figure 13:
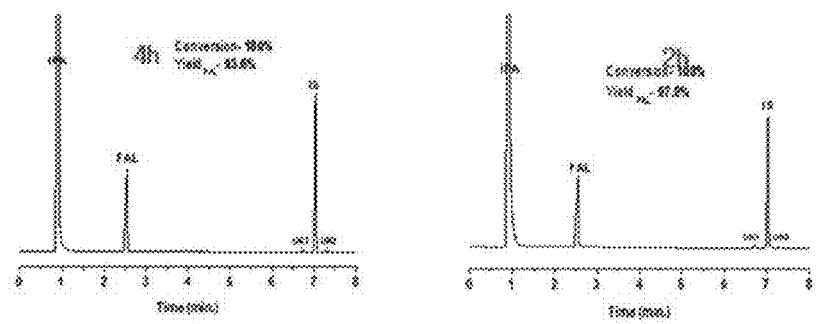
FIG. 13 shows graphs illustrating the analysis data (gas chromatogram) of furfural alcohol conversion reactants obtained by transfer hydrogenation of furfural, and the changes in XRD structure of MOF-808 before and after reaction.
Figure 13:
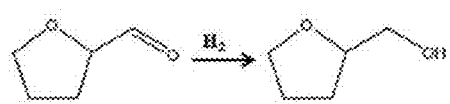
Figure 13:
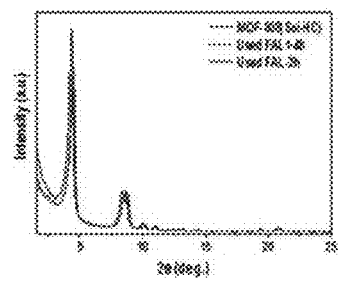

The catalyst (MOF-808) in an amount of 0.25 g was added into a batch reactor, in which a reactant (furfural, 0.5 g), a hydrogen source (isopropanol, 25 g), and a reference material (naphthalene, 0.25 g) were dissolved, and hydrogenation reaction was performed at 120° C. The results are shown in FIG. 13. As a result, within 2 hours of the reaction at 120° C., the performances of furfural conversion (100%) and furfuryl alcohol selectivity (98%) were revealed. The result of XRD analysis before and after the reaction confirmed that there was no change in the structural stability of Zr-MOF.

The invention claimed is:

1. A method of transfer hydrogenation, comprising transferring hydrogen from a hydrogen donor to a hydrogen acceptor by using a catalyst which is formed of a metal-organic framework having an MOF-808 based X-ray diffraction pattern.

2. The method of claim 1, wherein the metal-organic framework is represented by Formula 1 or Formula 2 below:

$$M_6O_4(OH)_4(BTC)_2(HCOO)_6 \quad \text{[Formula 1]}$$

wherein M is a group 4A or 4B element, or a lanthanide metal whose oxidation state is $4^+$, and BTC is Benzenetricarboxylate:

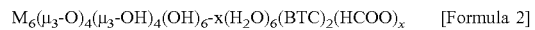

$$M_6(\mu_3\text{-O})_4(\mu_3\text{-OH})_4(OH)_6\text{-x}(H_2O)_6(BTC)_2(HCOO)_x \quad \text{[Formula 2]}$$

wherein x is any number in the range of 0 to 6, M is a group 4A or 4B element, or a lanthanide metal whose oxidation state is $4^+$, and BTC is Benzenetricarboxylate.

3. The method of claim 1, wherein the transfer hydrogenation is the transfer hydrogenation of ethyl levulinate (EL) into γ-valerolactone.

4. The method of claim 2, wherein the transfer hydrogenation is the transfer hydrogenation of ethyl levulinate (EL) into γ-valerolactone.

5. The method of claim 1, wherein the transfer hydrogenation is the transfer hydrogenation of furfural to furfuryl alcohol; levulinic acid (LA) to γ-valerolactone (GVL); furfural to 2-methylfuran (2-MF); 5-hydroxymethylfurfural (HMF) to 2,5-dimethylfuran (DMF); glycerol to 1,2-propanediol (1,2-PDO); fructose to 5-hydroxymethylfurfural (HMF); glucose to γ-valerolactone (GVL); fructose to γ-valerolactone (GVL); butyl levulinate (BL) to γ-valerolactone (GVL); glycerol to 1,2-PDO; (1-hydroxyethyl)benzene (1-HB) to ethylbenzene; 5-hydroxymethylfurfural (HMF) to 1,6-hexanediol (HDL); benzaldehyde to benzyl alcohol; hexahydrobenzaldehyde to hexahydrobenzyl alcohol; 4-methylbenzaldehyde to 4-methylbenzyl alcohol; methyl phenyl ketone to 1-phenylethanol; hexanal to 1-hexanol; 4-methyl-2-pentanone to 4-methyl-2-pentanol; cinnamaldehyde to cinnamyl alcohol; thiophene-2-aldehyde to 2-(hydroxymethyl) thiophene; 4-pyridinecarboxaldehyde to 4-pyridylcarbinol; or giranial to geraniol.

6. The method of claim 2, wherein the transfer hydrogenation is the transfer hydrogenation of furfural to furfuryl alcohol; levulinic acid (LA) to γ-valerolactone (GVL); furfural to 2-methylfuran (2-MF); 5-hydroxymethylfurfural (HMF) to 2,5-dimethylfuran (DMF); glycerol to 1,2-propanediol (1,2-PDO); fructose to 5-hydroxymethylfurfural (HMF); glucose to γ-valerolactone (GVL); fructose to γ-valerolactone (GVL); butyl levulinate (BL) to γ-valerolactone (GVL); glycerol to 1,2-PDO; (1-hydroxyethyl)benzene (1-HB) to ethylbenzene; 5-hydroxymethylfurfural (HMF) to 1,6-hexanediol (HDL); benzaldehyde to benzyl alcohol; hexahydrobenzaldehyde to hexahydrobenzyl alcohol; 4-methylbenzaldehyde to 4-methylbenzyl alcohol; methyl phenyl ketone to 1-phenylethanol; hexanal to 1-hexanol; 4-methyl-2-pentanone to 4-methyl-2-pentanol; cinnamaldehyde to cinnamyl alcohol; thiophene-2-aldehyde to 2-(hydroxymethyl) thiophene; 4-pyridinecarboxaldehyde to 4-pyridylcarbinol; or giranial to geraniol.

7. The method of claim 1, wherein isopropanol, methanol, ethanol, glycerol, butanol, cyclic ethers, benzyl alcohol, cyclohexanone, 2-propanol, ethylene glycol, 2,3-dihydroindole, 1,2,3,4-tetrahydroquinoline, cyclohexene, cyclohexadiene, limonene, hydrazine, ammonium formate, ammonium hypophosphite, or a mixture thereof is used as the hydrogen donor.

8. The method of claim 2, wherein isopropanol, methanol, ethanol, glycerol, butanol, cyclic ethers, benzyl alcohol, cyclohexanone, 2-propanol, ethylene glycol, 2,3-dihydroindole, 1,2,3,4-tetrahydroquinoline, cyclohexene, cyclohexadiene, limonene, hydrazine, ammonium formate, ammonium hypophosphite, or a mixture thereof is used as the hydrogen donor.

9. The method of claim 1, wherein the transfer hydrogenation is performed at a low temperature of 200° C. or below by using the catalyst.

10. The method of claim 2, wherein the transfer hydrogenation is performed at a low temperature of 200° C. or below by using the catalyst.

11. The method of claim 1, wherein the transfer hydrogenation is the open-system transfer hydrogenation which utilizes a solvent-reflux method.

12. The method of claim 2, wherein the transfer hydrogenation is the open-system transfer hydrogenation which utilizes a solvent-reflux method.

13. A method of preparing γ-valerolactone by transfer hydrogenation of ethyl levulinate (EL) using a catalyst which is formed of a metal-organic framework having an MOF-808 based X-ray diffraction pattern.

14. The method of claim 13, wherein the metal-organic framework is represented by Formula 1 or Formula 2 below:

$$M_6O_4(OH)_4(BTC)_2(HCOO)_6 \quad \text{[Formula 1]}$$

wherein M is a group 4A or 4B element, or a lanthanide metal whose oxidation state is $4^+$, and BTC is Benzenetricarboxylate;

$$M_6(\mu_3\text{-O})_4(\mu_3\text{-OH})_4(OH)_{6-x}(H_2O)_6(BTC)_2(HCOO)_x \quad \text{[Formula 2]}$$

wherein x is any number in the range of 0 to 6, M is a group 4 A or 4 B element, or a lanthanide metal whose oxidation state is 4 $^+$, and BTC is Benzenetricarboxylate.

15. The method of claim 13, wherein the transfer hydrogenation is performed using isopropanol, methanol, ethanol, glycerol, butanol, cyclic ethers, benzyl alcohol, cyclohexanone, 2-propanol, ethylene glycol, 2,3-dihydroindole, 1,2,3,4 -tetrahydroquinoline, cyclohexene, cyclohexadiene, limonene, hydrazine, ammonium formate, ammonium hypophosphite, or a mixture thereof as a hydrogen donor.

16. The method of claim 14, wherein the transfer hydrogenation is performed using isopropanol, methanol, ethanol, glycerol, butanol, cyclic ethers, benzyl alcohol, cyclohexanone, 2-propanol, ethylene glycol, 2,3-dihydroindole, 1,2,3,4-tetrahydroquinoline, cyclohexene, cyclohexadiene, limonene, hydrazine, ammonium formate, ammonium hypophosphite, or a mixture thereof as a hydrogen donor.

17. The method of claim 13, wherein the transfer hydrogenation is performed in a non-homogenous catalytic system.

18. The method of claim 13, wherein the transfer hydrogenation of ethyl levulinate (EL) is performed in an open-system which utilizes a non-homogenous catalyst and a solvent-reflux method.

19. A method for preparing furfuryl alcohol by transfer hydrogenation of furfural using a catalyst which is formed of a metal-organic framework having an MOF-808 based X-ray diffraction pattern.

20. The method of claim 19, wherein the metal-organic framework is represented by Formula 1 or Formula 2 below:

$$M_6O_4(OH)_4(BTC)_2(HCOO)_6 \quad \text{[Formula 1]}$$

wherein M is a group 4 A or 4 B element, or a lanthanide metal whose oxidation state is $4^+$, and BTC is Benzenetricarboxylate;

$$M_6(\mu_3\text{-O})_4(\mu_3\text{-OH})_4(OH)_{6-x}(H_2O)_6(BTC)_2(HCOO)_x \quad \text{[Formula 2]}$$

wherein x is any number in the range of 0 to 6, M is a group 4 A or 4 B element, or a lanthanide metal whose oxidation state is $4^+$, and BTC is Benzenetricarboxylate.

* * * * *

UNITED STATES PATENT AND TRADEMARK OFFICE
CERTIFICATE OF CORRECTION

PATENT NO. : 10,195,592 B2
APPLICATION NO. : 15/584933
DATED : February 5, 2019
INVENTOR(S) : Young Kyu Hwang Page 1 of 1

It is certified that error appears in the above-identified patent and that said Letters Patent is hereby corrected as shown below:

In the Claims

Column 16, Claim 2, Line 25:
"wherein x is any number in the range of 0to 6, M is a group" should read, --wherein x is any number in the range of 0 to 6, M is a group--.

Column 18, Claim 14, Line 2-3:
"4 A or 4 B element, or a lanthanide metal whose oxidation state is 4 +, and BTC is Benzenetricarboxylate." should read, --4A or 4B element, or a lanthanide metal whose oxidation state is 4+, and BTC is Benzenetricarboxylate.--.

Column 18, Claim 20, Line 32:
"wherein M is a group 4 A or 4 B element, or a lanthanide" should read, --wherein M is a group 4A or 4B element, or a lanthanide--.

Column 18, Claim 20, Line 38:
"4 A or 4 B element, or a lanthanide metal whose oxidation" should read, --4A or 4B element, or a lanthanide metal whose oxidation--.

Signed and Sealed this
Twelfth Day of November, 2019

Andrei Iancu
*Director of the United States Patent and Trademark Office*